United States Patent [19]
Gasior et al.

[11] Patent Number: 5,261,523
[45] Date of Patent: Nov. 16, 1993

[54] TRIPLE-STRAND ROLLER CHAIN CONVEYOR WITH ACCUMULATING PALLETS

[75] Inventors: John A. Gasior, Livonia; Robert T. Fishaw, Plymouth, both of Mich.

[73] Assignee: Ingersoll-Rand Company, Woodcliff Lake, N.J.

[21] Appl. No.: 991,827

[22] Filed: Dec. 16, 1992

[51] Int. Cl.⁵ ............................................. B65G 17/00
[52] U.S. Cl. ............................ 198/465.3; 198/803.2
[58] Field of Search ............. 198/465.1, 465.3, 803.01, 198/803.2

[56] References Cited

U.S. PATENT DOCUMENTS

| | | | |
|---|---|---|---|
| 4,088,220 | 5/1978 | Jacksch et al. | 198/803.2 |
| 4,598,818 | 7/1986 | Miller | 198/465.3 X |
| 4,699,266 | 10/1987 | Weiss | 198/803.2 |
| 4,712,670 | 12/1987 | Burkhardt | 198/465.1 X |
| 4,776,452 | 10/1988 | Burkhardt | 198/465.1 X |
| 4,776,453 | 10/1988 | Miller | 198/803.2 |
| 4,896,763 | 1/1990 | Hordyk et al. | 198/803.2 |
| 4,934,515 | 6/1990 | Linden | 198/465.3 X |
| 5,178,261 | 1/1993 | Matheson et al. | 198/803.2 |

FOREIGN PATENT DOCUMENTS

| | | | |
|---|---|---|---|
| 3539303 | 5/1987 | Fed. Rep. of Germany ... | 198/465.3 |
| 2660293 | 10/1991 | France | 198/803.2 |
| 1407765 | 7/1988 | U.S.S.R. | 198/465.3 |

*Primary Examiner*—D. Glenn Dayoan
*Attorney, Agent, or Firm*—Walter C. Vliet

[57] ABSTRACT

A triple-strand conveyor is provided with guiding rollers on the pallet which coact with a resilient driving roller and a cam plate guide to provide positive control of the pallet during rollover at the conveyor ends from the top to bottom positions and vice versa. The combination of positive drive and resilient control reduces the chain forces associated with rollover and minimizes the need for constant readjustment of the chain tension during operation. The rollers eliminate chain contact during the rollover function thereby eliminating the need for elaborate chain contact and guide devices associated with the prior art.

9 Claims, 4 Drawing Sheets

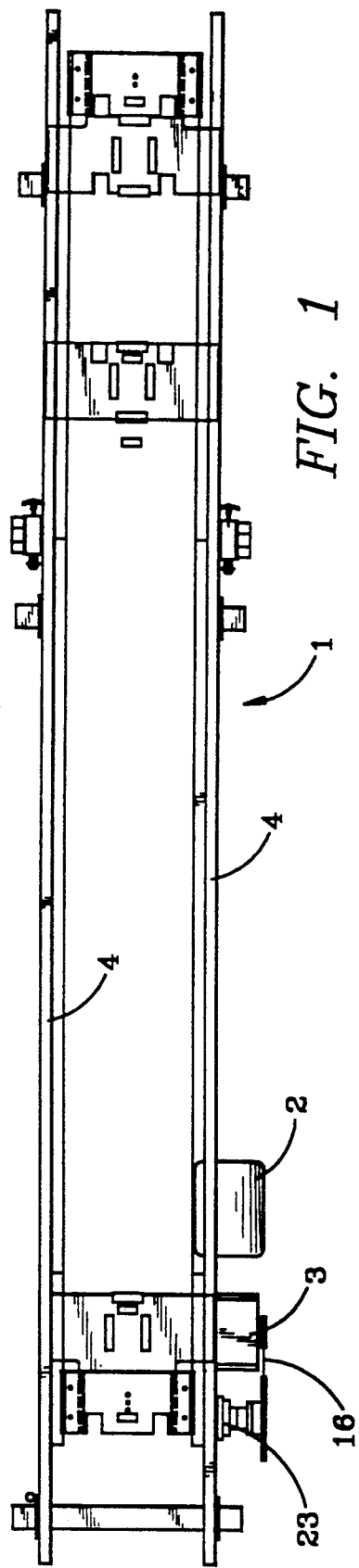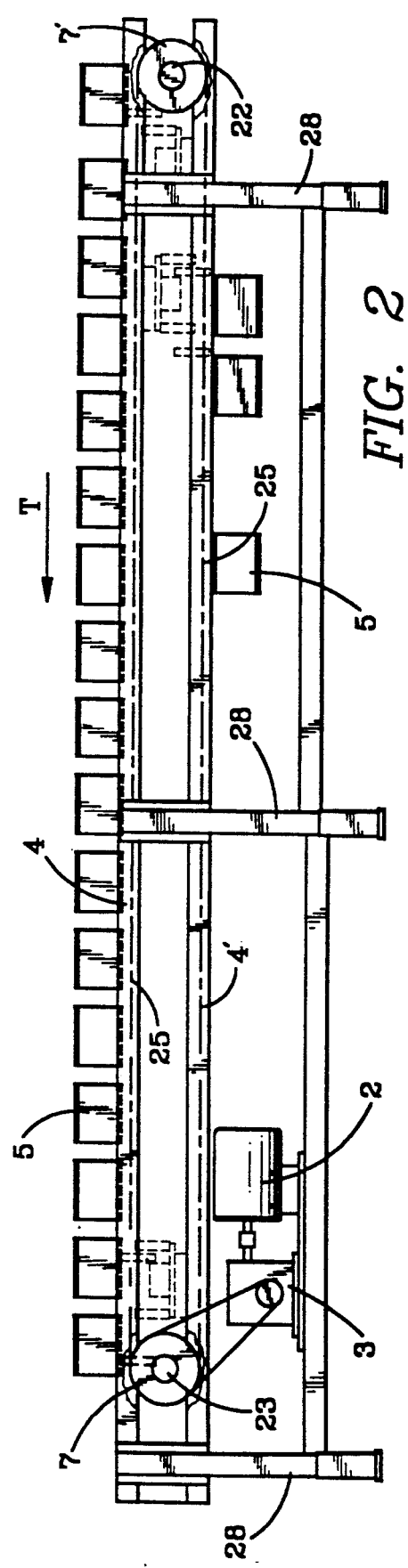

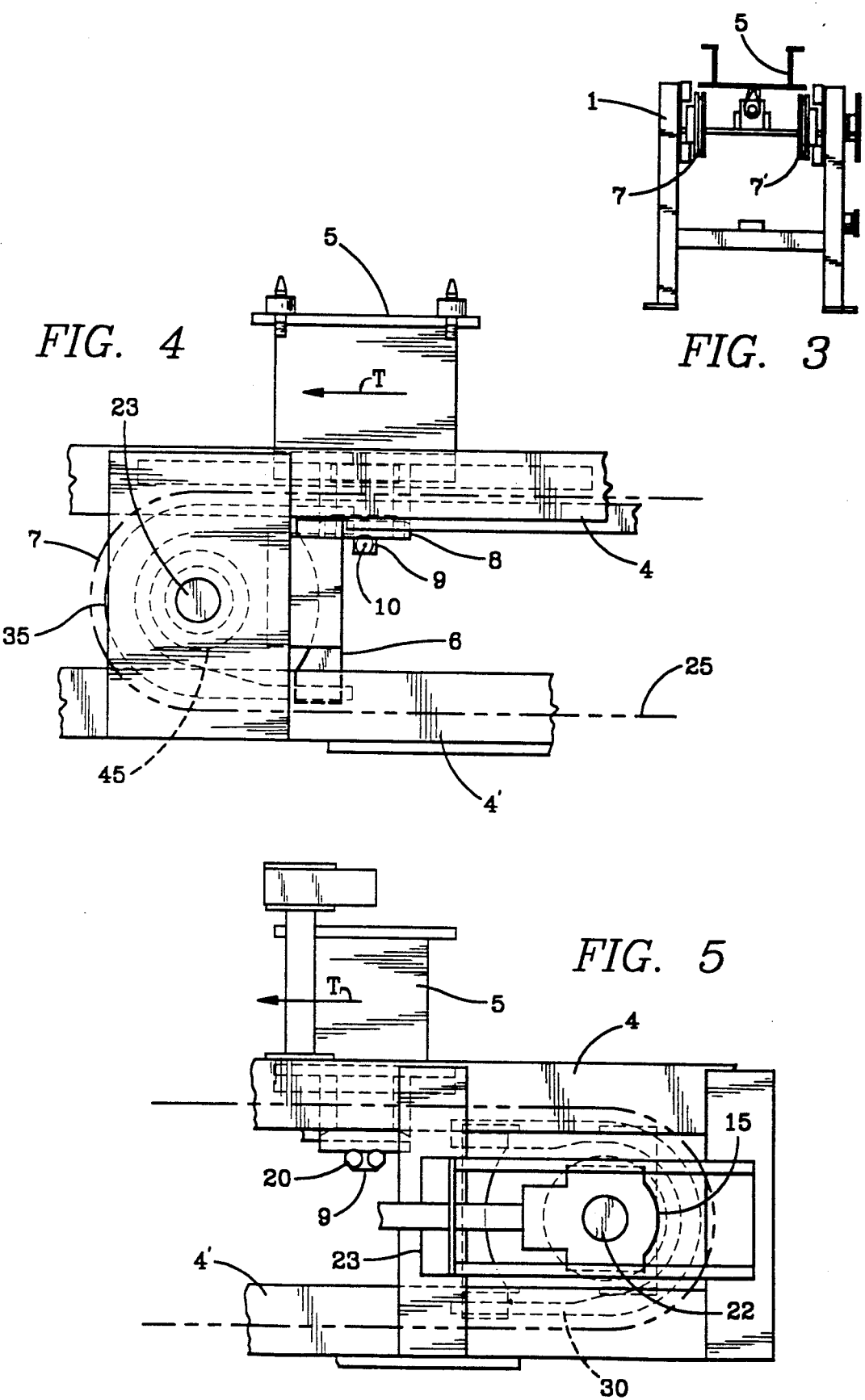

TRIPLE-STRAND ROLLER CHAIN CONVEYOR WITH ACCUMULATING PALLETS

BACKGROUND OF THE INVENTION

This invention relates generally to conveyors and more particularly to a class of conveyors called Triple-Strand or Triple-Strand roller chain type conveyors wherein the generally loaded pallets are conveyed in one direction on the top of the conveyor and thereafter the empty pallets are returned along the bottom of the conveyor, thereby eliminating the requirement for a separate return conveyor.

In the prior art the pallet has been conveyed in close contact with the chain around the end sprockets. The control of the pallet through the transition is difficult unless close tolerances, high chain tension, and accurate guide surfaces are maintained. Otherwise, the pallets tend to flop, slip or break around the turns creating high forces on the chains and associated drive equipment.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a triple-strand roller chain conveyor comprising roller means attached to a transferred conveyor pallet for the purposes of controlling the conveyor end pallet rollover transition; means associated with the ends of the conveyor for receiving the roller means including cam means for guiding the rollers through the transition; and resilient means for driving, guiding, and resiliently loading the roller means against said cam means through the transition.

The foregoing and other aspects will become apparent from the following detailed description of the invention when considered in conjunction with the accompanying drawing figures.

BRIEF DESCRIPTION OF THE DRAWING FIGURES

FIG. 1 is a plan view of a typical triple-strand conveyor;

FIG. 2 is a side elevation of the conveyor of FIG. 1;

FIG. 3 is an end elevation of the conveyor of FIG. 1;

FIG. 4 is a partial side elevation of the head shaft area of a conveyor according to the present invention;

FIG. 5 is a partial cross section of the tail shaft portion of a conveyor according to the present invention;

DETAILED DESCRIPTION

Figure 6:
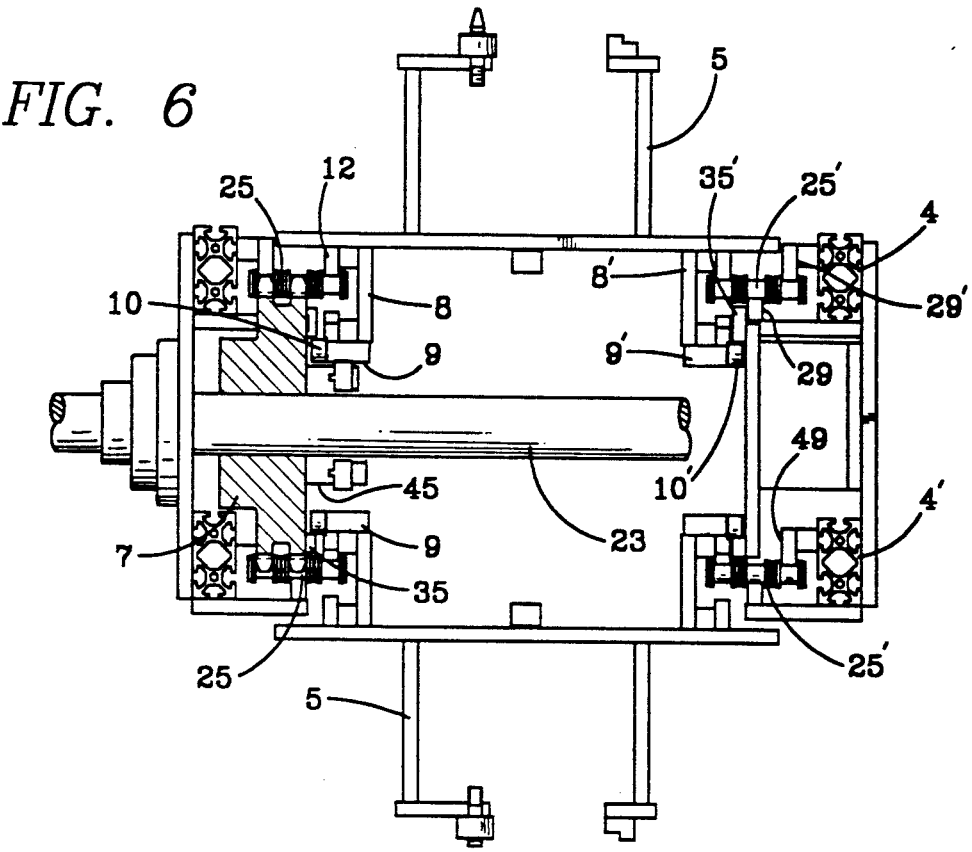
FIG. 6 is a partial end elevation of the head shaft area of a conveyor according to the present invention.
Figure 7:
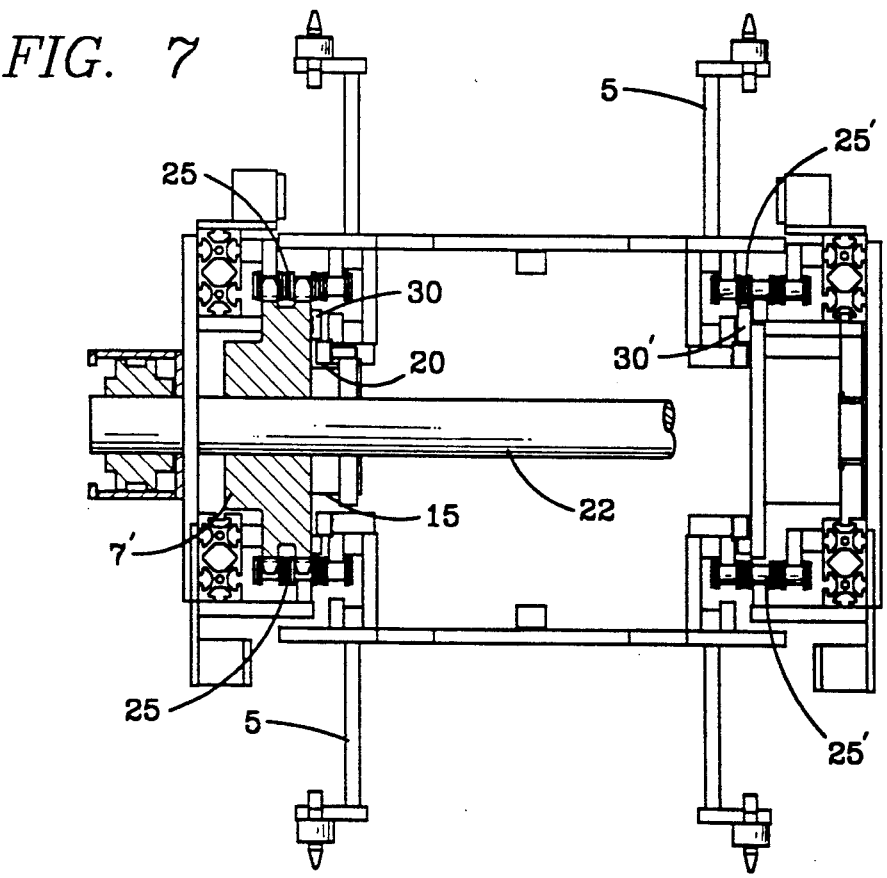
FIG. 7 is a partial end elevation of the tail shaft portion of a conveyor according to the present invention.

Referring to FIGS. 1, 2, and 3, a conveyor is shown of the triple-strand type generally referred to by reference numeral 1.

In general, the conveyor is comprised of a plurality of supports 28 which position the conveyor relative to, for example, a production floor. A conveyor frame is shown positioned on the supports 28 and in general comprises two top rails 4 and two bottom rails 4' spaced apart at a convenient width and height to form the supporting structure for the triple-strand conveyor chain 25 (best seen in FIG. 2).

A head shaft 23 and a tail shaft 22 are conveniently supported within the frame near the ends. The head shaft is provided with a pair of matched double sprockets 7 and the tail shaft 22 is provided with a pair of matched double sprockets 7' which drives the triple-strand chain 25. The sprocket 23 is in turn driven by a drive chain 16 which in turn is driven by the gear reducer 3 and motor 2.

In the transfer direction indicated by the arrow designated T a plurality of pallets 5 coact with the transfer chain which guidingly drives the pallets in the direction of transfer, the pallets being carried along by the triple-strand chain as will be more particularly described later.

Referring now to FIG. 4, the partial head shaft end elevation shows a pallet 5 being transferred into the head shaft area as will be more fully described later. The pallet is being carried along by the triple-strand roller chain 25. A cam roller 10 is shown attached to a bottom pad plate 9 which is part of a rail bracket 8, as best seen in FIG. 6. This bracket is attached to the pallet 5.

It should be understood that one or two such cam rollers are mounted o each side of the pallet 5 as designated by the duplicate prime numbers. A C-shaped cam plate 35 is shown. This receives the cam roller 10 as the pallet is transferred to the end of the conveyor, which in combination with a resilient roller 45 and bottom pad plate 9 drive the pallet around the end of the conveyor.

Referring to FIGS. 4 and 6, it should be appreciated by one skilled in the art that the double sprocket 7 on one side of the head shaft 23, and a duplicate double sprocket, not shown for clarity, on the opposite of the head shaft 23, engage the triple-strand roller chain 25 and as the head shaft 23 is driven in rotation the triple-strand roller conveyor chain is in turn driven around the sprocket and thence along the conveyor length.

A plurality of chain guides 29 and 29' generally support the triple-strand chain in a cantilevered fashion. Similar guides 49 and 49' support the roller chain in cantilevered fashion during its return travel.

The pallet 5 is shown supported on a pallet top rail 12 on the inner cantilevered end of the roller chain. During the return the pallet is supported on the inward end of the ca levered roller chain by the pallet bottom rail 9. The duplicate prime numbered elements are shown for the opposite side of the conveyor.

Generally, in the prior art, the pallet is provided with a close fitting guide which intimately contacts the roller chain through the transition from the top to the bottom portion. In order for these to function properly the chain must be maintained in proper tension and the guides must be accurately machined to reflect the radius of the turn. Otherwise considerable flop or slip is experienced as the pallet goes over and/or up the end of the conveyor. The resulting forces can create an annoying and potentially damaging instantaneous chain loading.

According to the present invention, the pallet bottom pad 9 is provided with a cam roller 10 or two cam rollers 20 which engage cam plate 35 and resilient tire 45 at the end of the conveyor in the head shaft 23 area and oppositely cam plate 30 and a resilient tire 15 in the tail shaft 22 area. As best seen in FIG. 5, the cam roller 20 in the tail shaft area is forced against the cam 30 by the bottom pad 9' being squeezed by the tire 15.

As seen in FIG. 4, a single cam roller per side may be provided on the pallet 5 to engage the cam plate 30 or 35 and the bottom pad 9 engages the resilient tire roller 15 or 45 at each end of the conveyor. In the case of a single cam roller, the pallet bottom pad 9 engages the resilient tire 15, 45 at each end of the conveyor and resiliently restrains the pallet during the rollover turn. This substantially cushions the flopping force experienced and in fact the conveyor pallet is lifted slightly out of contact with the triple-strand chain during the rollover function. This permits the chain to have a greater tolerance in tension and removes the force generated in the pallet flopping over the end of the conveyor from the chain. A single roller has been found satisfactory for use with relatively light pallets.

As shown in FIG. 5, a double cam roller 20 may be provided to provide better control for the pallet around the turn. This further reduces the tendency of the pallet to flop as it goes around the turn.

Figure 8:
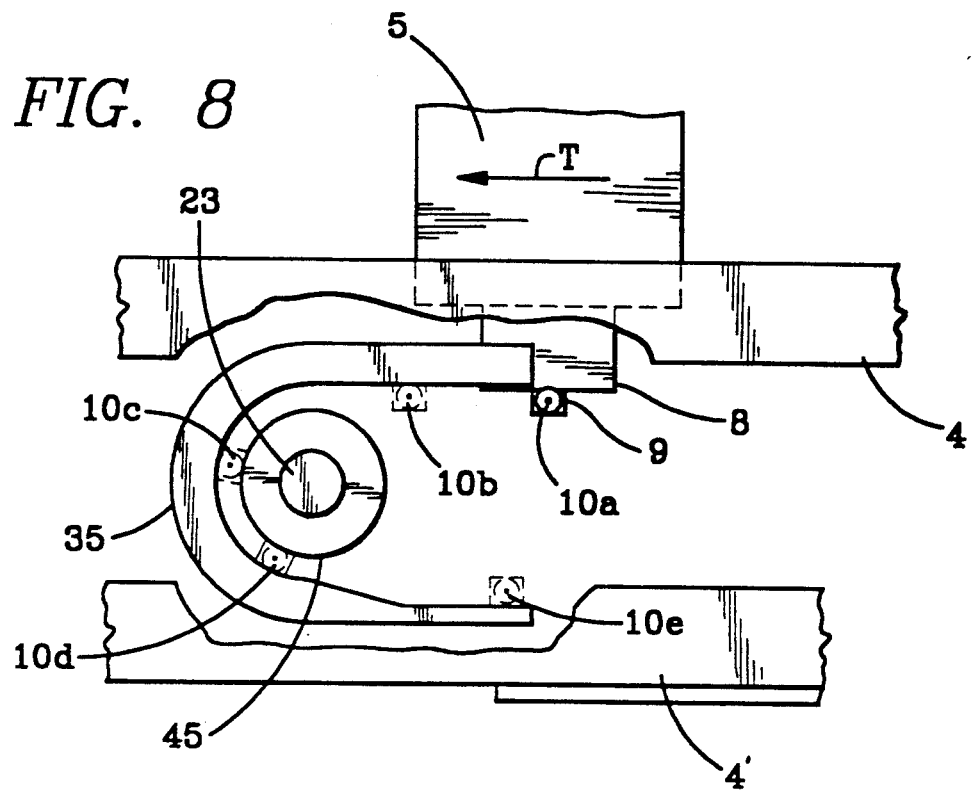
FIG. 8 is a schematic of the pallet guide in the head shaft area of the present invention.
Figure 9:
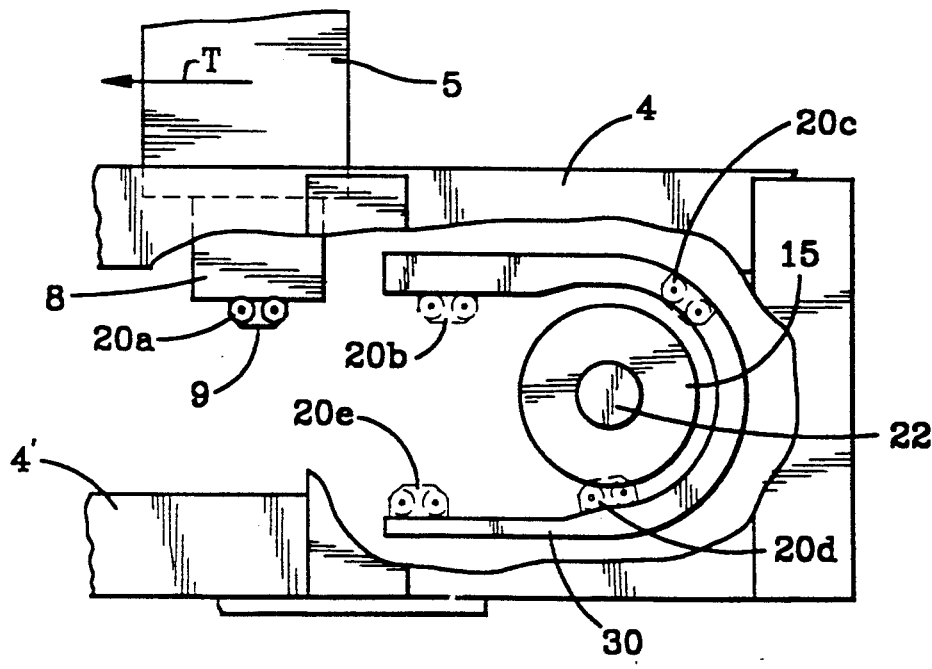
FIG. 9 is a schematic of an alternate embodiment of the guide according to the present invention in the tail shaft area.

The operation of the roller cam 10, 20 may best be understood by referring to FIGS. 8 and 9.

FIG. 8 shows a single cam roller 10a attached to a conveyor pallet 5 on the pallet pad 9 showing the progression of the roller as indicated by the phantom line progression of the rollers 10b, 10c, 10d, and 10e through the turn.

It should be understood by one skilled in the art that the cam plates 30 and 35 may be positioned by means of a cam bracket 6 or 6' at the respective ends of the conveyor. The cam plate 35 is chosen to generally raise the pallet clear of the roller chain during the initial portion of the turn and thereafter having completed the rotation gently redeposit the pallet on the roller chain on the bottom portion of the conveyor.

The cam plate 30 similarly gently lifts the pallet as it approaches the end of the conveyor, permits rollover and gently redeposits the pallet on the top of the roller chain 25 on the top portion of the conveyor. This is best seen in FIG. 9.

The distance between the cam plate 30,35 surface and the bottom pad 9, is greater than the distance between the cam plate surface 30,35 and the resilient tires 15,45.

The resilient tires 15 and 45 are compressed by the bottom pad 9 as the cam rollers go against the cam plate at each respective end. The resilient nature of the tires permits them to grip the bottom pad and the tire is squashed by the bottom pad as the roller contacts the cam. This provides the required drive of the pallet through the turn without chain contact and resiliently controls the flop or slip of the conveyor pallet as it goes through the end transition.

FIG. 8 depicts a single roller cam 10 and FIG. 9 depicts a double roller cam 20. It should be understood that this is for purpose of convenience and that either one or two rollers is provided for each side of the pallet. The function at both ends is similar for one or two rollers. Thus, in this invention we have eliminated the critical shaped pieces and the need for chain tensioning devices in the present invention.

In summary, according to the present invention, two bottom pads are mounted to the bottom of the pallet, one on each side. Mounted to the side of each bottom pad are one or two cam follower bearings as described. Two resilient tires are mounted on each conveyor shaft (head drive shaft and tail or takeup shaft), one on each side near the sprocket. Along the side of each conveyor sprocket is mounted a cam plate. As the pallet approaches the end of the conveyor the cam follower enters the cam plate area. The pallet bottom pads engage the resilient tires and force the cam followers against the cam plate driving the pallet around the end of the conveyor a the tire 15 is mounted to and rotates with the conveyor shafts.

On the adjustable takeup shaft at the tail end of the conveyor the cam plate is mounted on the shaft with sleeve bearings or the like and therefore any linear adjustment made to the conveyor takeup shaft (tail shaft) automatically includes the cam plate.

What is claimed is:

1. A pallet rollover control device for a triple-strand conveyor comprising:
   roller means attached to a transferred conveyor pallet for the purposes of controlling end rollover transition of said pallet from a position supported on a top portion of a continuous running chain in one direction to a suspended support position on a return running portion of said chain;
   means associated with the ends of said conveyor for receiving said roller means including cam means for guiding said rollers through the transition; and
   resilient means for driving, guiding, and resiliently loading said rollers against said cam means through said transition.

2. A pallet rollover control device for a triple-strand conveyor according to claim 1, wherein said means associated with the ends of said conveyor for receiving said roller means further comprises a cam plate and said resilient means further comprises a resilient tire.

3. A pallet rollover control device for a triple-strand conveyor according to claim 1, wherein said roller means comprises a cam roller attached to said conveyor pallet.

4. A pallet rollover control device for a triple-strand conveyor according to claim 1, wherein said resilient means further comprises resilient tire means being driven by a conveyor head shaft.

5. A pallet rollover control device for a triple-strand conveyor according to claim 1, wherein said resilient means further comprises resilient tire means being driven by a conveyor tail shaft.

6. A pallet rollover control device for a triple-strand conveyor according to claim 1, wherein said pallet is lifted clear of a triple-strand roller chain during said transition to remove rollover forces from said roller chain.

7. A pallet rollover control device for a triple-strand conveyor according to claim 2, wherein said cam plate is "C" shaped and said resilient tire is disposed within the boundaries of said cam plate in elevation.

8. A pallet rollover control device for a triple-strand conveyor according to claim 2, wherein said resilient tire extends to one side of said cam plate to engage a portion of said pallet during transition to stabilize and drive the pallet through the rollover transition.

9. A pallet rollover control device for a triple-strand conveyor according to claim 2, wherein said roller means comprises a plurality of cam rollers attached to said conveyor pallet spaced apart to simultaneously contact said cam plate to thereby further stabilize said pallet during end rollover transition.

* * * * *